United States Patent
Lord et al.

(10) Patent No.: US 7,925,360 B2
(45) Date of Patent: *Apr. 12, 2011

(54) SYSTEM FOR RESETTING SUBSETS OF MOTES WITHIN A NETWORK TO DIFFERENT OPERATIONAL STATES IN ACCORDANCE WITH TYPE OF SENSORS

(75) Inventors: Robert W. Lord, Seattle, WA (US); Alexander J. Cohen, Mill Valley, CA (US); John D. Rinaldo, Jr., Bellevue, WA (US); Edward K. Y. Jung, Bellevue, WA (US); Mark A. Malamud, Seattle, WA (US); Royce A. Levien, Lexington, MA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/586,541

(22) Filed: Sep. 22, 2009

(65) Prior Publication Data
US 2010/0174942 A1      Jul. 8, 2010

Related U.S. Application Data

(63) Continuation of application No. 11/212,482, filed on Aug. 26, 2005, now Pat. No. 7,603,181.

(51) Int. Cl.
*G05B 19/18*      (2006.01)

(52) U.S. Cl. .......................................... 700/2; 700/249

(58) Field of Classification Search .............. 700/2, 249, 700/116, 216; 235/451; 455/423; 710/305; 702/179
See application file for complete search history.

(56) References Cited

U.S. PATENT DOCUMENTS

| 6,697,654 | B2 | 2/2004 | Lorenz et al. | |
|---|---|---|---|---|
| 7,155,365 | B1* | 12/2006 | Gross et al. | 702/179 |
| 2003/0172221 | A1* | 9/2003 | McNeil | 710/305 |
| 2005/0096776 | A1* | 5/2005 | Beaulieu et al. | 700/116 |
| 2006/0046711 | A1* | 3/2006 | Jung et al. | 455/423 |
| 2006/0206235 | A1* | 9/2006 | Shakes et al. | 700/216 |
| 2006/0289648 | A1* | 12/2006 | Shafer | 235/451 |

OTHER PUBLICATIONS

Norman Makoto Su, et al., Augmenting Film and Video Footage with Sensor Data, IEEE Annual Conference on Pervasive Computing and Communications, 2004, University of California, Los Angeles, CA, USA.

Frank Stajano, The Resurrecting Duckling—what next? May 7, 2000, http://www-Ice.eng.cam.ac.uk/~fms27/duckling/duckling-what-next.html.

Hayley Iben, Ali Lakhai & Rachel Rubin, Watchdog Designs for TinyOS Motes, May 16, 2002, Department of Electrical Engineering and Computer Sciences, University of California at Berkeley.

Peter Bajcsy, Rob Kooper, David Scherba & Martin Urban, Toward Hazard Aware Spaces: Knowing Where, When and What Hazards Occur, Technical Report: alg05-001. Jun. 7, 2005, Automated Learning Group, National Center for Supercomputing Applications, Champaign, IL, US.

Sam Madden, Joe Hellerstein & Wei Hong, TinyDB: In-Network Query Processing in TinyOS, Version 0.4, Sep. 2003, University of California at Berkeley.

* cited by examiner

*Primary Examiner* — Le Luu (57) ABSTRACT

A method may include and/or involve a mote network receiving a signal to reset and applying the signal to reset to place the mote network into a reset condition.

45 Claims, 2 Drawing Sheets

SYSTEM FOR RESETTING SUBSETS OF MOTES WITHIN A NETWORK TO DIFFERENT OPERATIONAL STATES IN ACCORDANCE WITH TYPE OF SENSORS

CROSS REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)), and incorporates by reference in its entirety all subject matter of the following listed application(s) (in the event of any inconsistencies between the instant application and an application incorporated by reference, the instant application controls):

1. For purposes of the USPTO extra-statutory requirements, the present application constitutes a continuation of U.S. patent application Ser. No. 11/212,482 entitled SYSTEMIC RESET OF A MOTE NETWORK, naming Robert W. Lord, Alexander J. Cohen, John D. Rinaldo, Jr., Edward K.Y. Jung, Mark A. Malamud, and Royce A. Levien as inventors, filed on Aug. 26, 2005 now U.S. Pat. No. 7,603,181, or is an application of which a application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s). All subject matter of the Related Applications and of any and all parent, grandparent, great-grandparent, etc. applications of the Related Applications is incorporated herein by reference to the extent such subject matter is not inconsistent herewith.

TECHNICAL FIELD

The present disclosure relates to mote networks and mote network reset.

BACKGROUND

Mote networks may be prone to localized and systemic failures due to non-robustness of the motes and/or the harshness of the environment into which they are deployed. Noise, communication failures, sensor failures, malfunctions, and other conditions may cause a mote network to have an unstable state.

SUMMARY

The following summary is intended to highlight and introduce some aspects of the disclosed embodiments, but not to limit the scope of the claims. Thereafter, a detailed description of illustrated embodiments is presented, which will permit one skilled in the relevant art to make and use various embodiments.

A method may include and/or involve a mote network receiving a signal to reset and applying the signal to reset to place the mote network into a reset condition. Receiving a signal to reset and applying the signal to reset to place the mote network into a reset condition may include and/or involve returning one or more motes individually to or near to an identified saved state, and/or returning one or more motes individually to or near to a state saved at a particular time, and/or returning the mote network to or near to an identified saved state, and/or returning the mote network to or near to a state saved at a particular time, and/or signaling the mote network with state information stored external to the mote network, and/or signaling the mote network to apply state information stored by the one or more motes of the mote network, and/or returning at least one mote of the mote network to a manufactured default state, and/or performing a reset and restart of at least one mote of the mote network, and/or erasing stored data of at least one mote of the mote network, and/or at least one mote of the mote network authenticating a source of the signal, and/or signaling with light, and/or signaling with sound, and/or signaling a mote network with the result that at least one mote removes itself from the mote network, and/or signaling a mote network with the result that at least one mote is assigned a status such that signals from the at least one mote are ignored and/or treated as unsuitable, and/or retaining one or more first types of state information on a mote-by-mote basis, and removing one or more second types of state information on a mote-by-mote basis, and/or causing all functional motes of the mote network to return to a same state, and/or causing one or more motes to enter into an energy saving state, and/or different sets of motes sequentially resetting to a previous mote operational state, and/or resetting at least one of mote clock, mote sensor, mote knowledge of neighbors, or mote knowledge of environmental factors, and/or a reset signal propagating through the mote network, and/or signaling the mote network when data collected from the mote network indicates the presence of one or more environmental factors associated with a reset condition. Signaling the mote network to apply state information stored by the one or more motes of the mote network may include and/or involve signaling one or more motes to obtain reset state information from one or more other motes. At least one mote of the mote network authenticating a source of the signal may include and/or involve at least one mote of the mote network extracting authentication information from the signal and applying the authentication information to authenticate the source of the signal.

The method may include and/or involve one or more motes of the mote network creating a network restore point as a result of receiving the signal.

The method may include and/or involve the one or more motes of the mote network providing distributed storage for information of the network restore point.

The method may include and/or involve storing information of the network restore point external to the mote network.

The method may include and/or involve signaling the mote network with the result that the network is reset to a previous operational state as a result of completion of a task by the mote network.

The method may include and/or involve signaling the mote network with the result that the network is reset to a previous operational state as a result of damage to the mote network.

The method may include and/or involve signaling the mote network with the result that the network is reset to a previous operational state as a result of at least one of addition, removal, failure, or reconfiguration of one or more motes of the mote network.

The method may include and/or involve at least one mote of the mote network communicating stored information before returning to a previous mote operational state.

The method may include and/or involve signaling the mote network with information about a common time at which to perform a reset.

The method may include and/or involve signaling the mote network with a synchronization signal prior to a reset signal.

The method may include and/or involve one or more motes of the network signaling success or failure of applying the signal to reset.

A mote system utilizing at least one mote, where the mote may include and/or involve logic to receive a signal to reset and to apply the signal to reset to place the mote into a reset condition. The logic to receive a signal to reset and to apply the signal to reset to place the mote into a reset condition may include and/or involve logic to return the mote to or near to an identified saved state, and/or logic to return the mote to or near to a state saved at a particular time, and/or logic to return the mote to or near to an identified saved state, and/or logic to return the mote to or near to a state saved at a particular time, and/or logic to apply state information stored external to the mote network, and/or logic to apply state information stored by the one or more other motes of the mote network, and/or logic to return the mote to a manufactured default state, and/or logic to reset and restart the mote, and/or logic to erase data stored by the mote, and/or logic to authenticate a source of the signal to reset, and/or logic to receive a light signal to reset, and/or logic to receive a sound signal to reset, and/or logic to enter into an energy saving state as a result of receiving the signal to reset, and/or logic to reset at least one of mote clock, mote sensor, mote knowledge of neighbors, or mote knowledge of environmental factors as a result of receiving the signal to reset. The logic to receive a signal to reset and to apply the signal to reset to place the mote into a reset condition may include and/or involve logic to receive state information from one or more other motes. The logic to authenticate a source of the signal to reset may include and/or involve logic to extract authentication information from the signal and apply the authentication information to authenticate the source of the signal to reset.

The mote may include and/or involve logic to store a restore point and to apply the restore point as a result of receiving the signal to reset.

The mote may include and/or involve logic to receive and apply network restore point information.

The mote may include and/or involve logic to communicate stored information before returning to a previous mote operational state as a result of receiving the signal to reset.

The mote may include and/or involve logic to receive and apply information about a time at which to perform a reset.

The mote may include and/or involve logic to receive and apply a synchronization signal prior to receiving and applying the signal to reset.

The mote may include and/or involve logic to signal success or failure of applying the signal to reset.

A mote network may include and/or involve logic to receive a signal to reset and to apply the signal to reset to place the mote network into a reset condition. The logic to receive a signal to reset and to apply the signal to reset to place the mote network into a reset condition may include and/or involve logic to cause one or more motes of the mote network to remove itself from the mote network, and/or logic to assign at least one mote a status such that signals from the at least one mote are ignored and/or treated as unsuitable, and/or logic to cause a first set of motes to each have a first state, and to cause a second set of motes to each have a second state, and/or logic to cause all functional motes of the mote network to return to a same state, and/or logic to reset different sets of motes sequentially to a previous operational state, and/or logic to propagate the signal to reset through the mote network, and/or logic to signal the mote network to reset when data collected from the mote network indicates the presence of one or more environmental factors associated with a reset condition.

The mote network may include and/or involve logic to store a network restore point in a distributed fashion among motes of the mote network.

The mote network may include and/or involve logic to reset the mote network to a previous operational state as a result of completion of a task by the mote network.

The mote network may include and/or involve logic to reset the mote network to a previous operational state as a result of damage to the mote network.

The mote network may include and/or involve logic to reset the mote network to a previous operational state as a result of at least one of addition, removal, failure, or reconfiguration of one or more motes of the mote network.

Other system/method/apparatus aspects are described in the text (e.g., detailed description and claims) and drawings forming the present application.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

System Including a Mote Network

Figure 1:
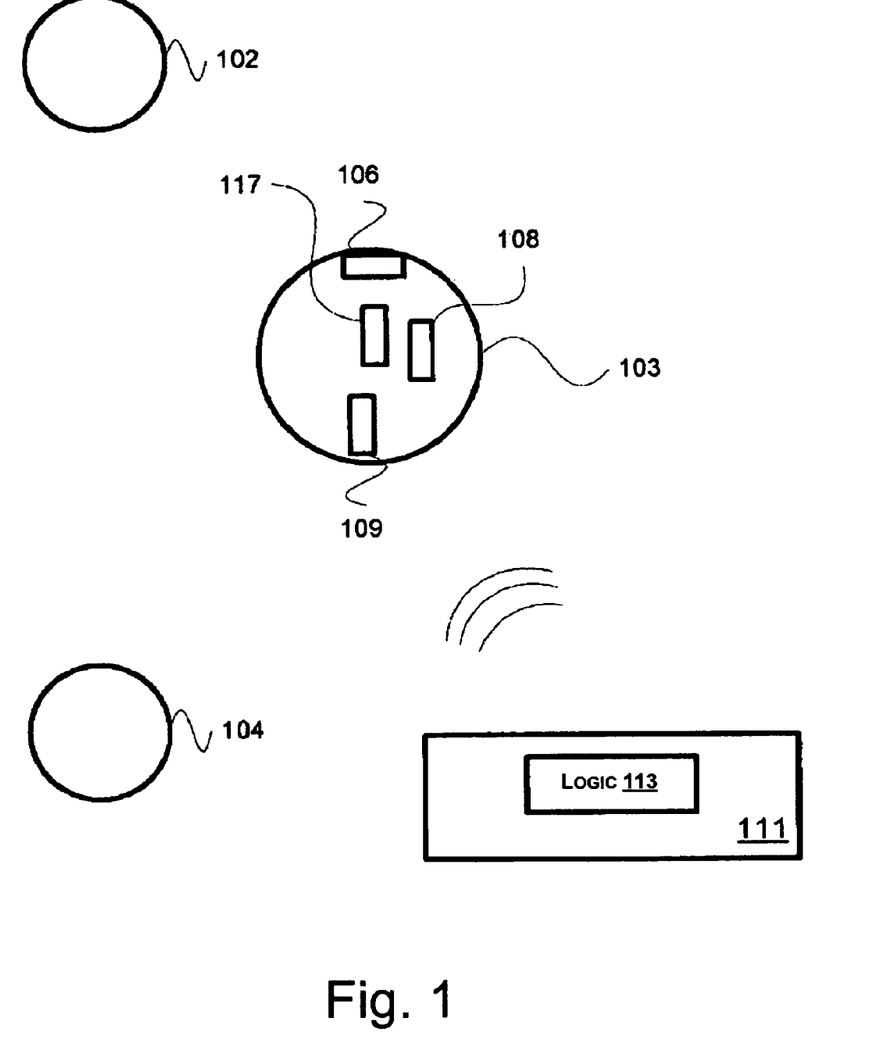
FIG. 1 is a block diagram of an embodiment of a system including a mote network.

FIG. 1 is a block diagram of an embodiment of a system including a mote network. In order to simplify the description, the network shown includes three mote sensors 102-104, although a mote network may include more or fewer (typically more) mote sensors in practice.

Elements of a mote sensor 103 are shown. Other mote sensors may comprise similar elements.

Mote sensor 103 comprises logic 108. The logic 108 (which may include memory) may be applied to cause the mote sensor to facilitate acts described herein.

Mote sensor 103 further comprises a communication interface 106. The mote 103 may employ this interface to communicate with other motes and/or devices external to the mote network. Communication may be accomplished wirelessly via radio frequency, using light, using sound, or by other mechanisms known in the art.

Device 111 is an example of an external device that may interact with the mote network. The device 111 may be a personal/laptop/desktop computer, handheld computing device, wireless device such as digital assistant or phone, or industrial or test equipment, to name just some of the possibilities. The external device 111 includes logic 113 to facilitate acts described herein.

Mote sensor 103 further comprises a clock 109 and a sensor 117. The sensor 117 may sense light/sound. Not all embodiments will include these features, but they may be present in others.

Network Reset

The mote network may be prone to localized and systemic failures due to non-robustness of the motes and/or the harshness of the environment into which they are deployed. Noise, communication failures, sensor failures, malfunctions, and other conditions may cause a mote network to have an unstable state. The mote network may support application of a reset signal in order to facilitate reliable and continued operation under such circumstances.

It may also be desired to reset a mote network during the course of its normal operation, either periodically or triggered by some event or condition. For example, a mote network used to capture data for scientific experiments might be reset at the start of each experiment.

The mote network may receive a signal to reset, and apply the signal to reset to place the mote network into a reset condition. The reset signal may be generated externally from the network (e.g. by an external device 111). The reset signal may be generated internally by the network itself (e.g. by one or more motes of the network). For example, motes 102-104 may communicate sensor data by passing the data from nearest neighbor to nearest neighbor. Mote 102 passes its sensor data to mote 103, mote 103 passes data for itself and mote 102 to mote 104, and mote 104 communicates sensor data for itself and motes 102 and 103 to an external device such as device 111. If a mote 103 stops working, data for itself and other motes 102 that it passes on may be lost. A reset condition may be initiated if either of still-working motes 102-104 or the external device 111 recognize that too much data is being lost. After a reset, each still-working mote may pass data to a currently working nearest mote, in this case, mote 102 would pass its data to mote 104.

Receiving a signal to reset and applying the signal to reset to place the mote network into a reset condition (henceforth, "reset signal application") may include and/or involve returning one or more motes individually to or near to an identified saved state. This may include and/or involve returning one or more motes individually to or near to a state saved at a particular time, and/or returning the mote network to or near to an identified saved state, and/or returning the mote network (vs. particular motes) to or near to a state saved at a particular time. For example, motes 102-104 may contain sensors 117 with parameter values that vary with ambient conditions. After a reset, all sensors 117 may initially operate using their initial parameter settings.

In some implementations, reset signal application may also or alternatively include and/or involve signaling the mote network with state information stored external to the mote network.

Reset signal application may in some cases involve signaling the mote network to apply state information stored by the one or more motes of the mote network. Thus, state information applied to effect the reset condition may come from within the network or from outside the network.

Reset signal application may involve signaling with light. For example, motes may be applied to a volume such as a crawl space or tunnel. Motes 102-104 distributed within the volume may reset each time a light pulse is sensed. Reset signal application may also or alternatively include and/or involve signaling with sound. For example, the at least one application described above may alternatively use sound to trigger reset and measure.

Reset signal application may also or alternatively include and/or involve different sets of motes sequentially resetting to a previous mote operational state. In other words, a reset signal may propagate through the network. In other situations, all motes of the network may reset at approximately the same time, due to reset synchronization or, for example, because the signal to reset is provided from an external device to all motes at approximately a same time.

Returning to the known operational state (henceforth, "reset"), may include and/or involve returning at least one mote of the mote network to a manufactured default state, and/or performing a reset and restart of at least one mote of the mote network (e.g. asserting a reset signal to a processor of a mote sensor). For example, a hung personal computer may be rebooted with the result that it performs self-test functions then restarts, so that either a problem is detected or the computer is responsive and in a known initial state. Similarly, a mote restart may include a self-test followed by restart to a known condition in terms of communicating with its neighbors, sensing, etc.

Reset may also involve erasing stored data of at least one mote of the mote network (e.g. purging memory contents of a mote sensor). Reset may include and/or involve resetting at least one of mote clock, mote sensor, mote knowledge of neighbors, or mote knowledge of environmental factors, among other things.

Due to the possibly "destructive" nature of reset and the possibility of data loss, one or more motes of the network may participate in authentication and/or authorization of a reset. In some situations, this may involve at least one mote of the mote network authenticating a source of the reset signal, for example by extracting and verifying authentication and/or authorization information such as keys, passwords, privileges, and so on from the reset signal. In some situations, at least one mote of the mote network may communicate stored information before returning to a previous mote operational state, thus preserving stored information before it is destroyed by the reset. For example, in any mote network where the reset signal might occur improperly or accidentally (say if a person mistakenly presses a button on the device generating the signal, or because of ambient noise), an authentication and or authorization protocol may be used before or at the time of reset to assure reset is deliberate. For example, if motes 102-104 are measuring light, temperature, and moisture in a forest, and/or a reset sound is sensed, mote 103 may use its communication interface 106 to obtain authentication information and/or a reset password prior to the motes 102-104 sending stored sensor data to the external device 111 before resetting.

It may be advantageous, in certain implementations, for the reset signal to result in at least one mote "removing" itself from the mote network. The removed mote may cease to respond to communications and/or may cease to procure and/or provide readings. In some situations, at least one mote may be assigned a status such that signals from the at least one mote are ignored and/or treated as unsuitable. Such a status may be assigned by the mote itself, by the mote network (e.g. one or more other motes of the network may assign the status to a mote), and/or by a device external to the network. For example, the reset process may be designed to include a self-test by each mote. If mote 103 detects as a result of the self-test that a sensor is not working properly, it may cease sensor measurements and may not respond to communications from other motes.

One manner of implementing reset may involve retaining one or more first types of state information on a mote-by-mote basis, and removing one or more second types of state information on a mote-by-mote basis. In other words, reset may involve setting subsets of motes within the network to different operational states, to effect an overall network reset condition. For example, in a mote network, some motes 102 may sense temperature, some motes 103, 104 may sense light, etc. A reset might be designed to capture then reinitiate data logging for one type of sensor. Thus a "temperature reset" might only affect mote 102.

In other situations, reset may involve causing all functional motes of the mote network to return to a same state, including but not limited to causing one or more motes to enter into an energy saving state. In the motes 102-104 in a forest example, all sensor readings from all motes may be provided in response to the reset signal. Reset might also include a mote 102 identifying if it is in a low power state, and, if so, limiting communications with other motes by say, sending messages only 1/10 as often (communication is often more energy intensive than either sensing or processing.).

When performing a reset, the mote network may apply state information stored by the one or more motes of the mote network. In other words, the reset state information may come from within and may involve one or more motes obtaining reset state information from one or more other motes. In other situations, each mote will apply its owned stored reset state information. In still other situations, the reset state information may come from a source external to the network.

To provide a form of feedback, one or more motes of the network may signal the success or failure of applying the signal to reset. This may provide useful information about which motes of the network may be relied upon to have achieved the reset condition.

Reset Synchronization

Figure 2:
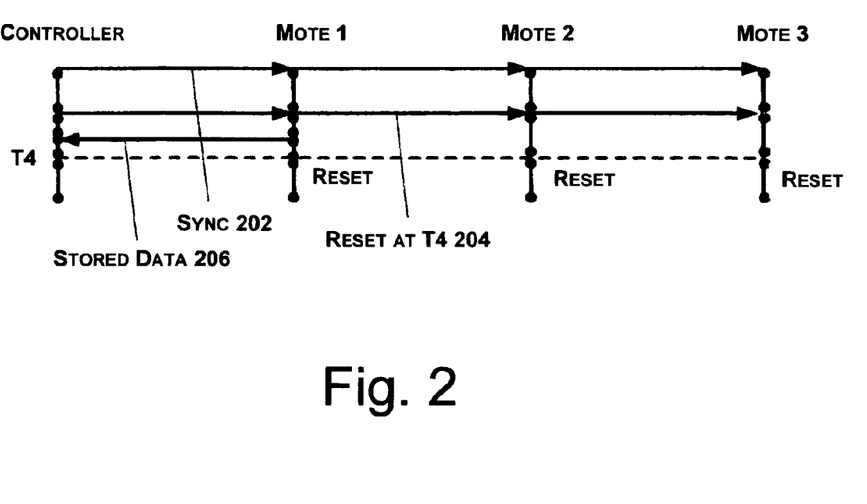
FIG. 2 is an action flow diagram of an embodiment of a process of resetting a mote network.

Prior to or as an alternative to providing a signal to reset, the mote network may be signaled with information about a common time at which to perform a reset. Motes of the network may then synchronously perform a reset at the indicated common time. To help ensure that the motes are synchronized to reset at a common time, the mote network may be provided with a synchronization signal prior to a reset signal. FIG. 2 describes an embodiment of this process.

The common time signal and/or the synchronization signal may be provided by the mote network itself (e.g. one or more motes of the network may provide the signal), or may be provided by a source external to the mote network.

Restore Points

The mote network may create a network restore point as a result of receiving the signal to reset. The network restore point may preserve state information of the network prior to applying the reset. Preserving state in this fashion may enable the network to later be restored to the state in existence prior to the reset. For example, each mote 102-104 may preserve as part of a restore point knowledge of its current nearest neighbors.

One or more motes of the mote network may provide distributed storage for information of the network restore point. In other words, the restore point information may be distributed throughout the network. In other embodiments the network restore point information may be stored external to the mote network.

Reset Conditions

In some situations, the mote network may be signaled to reset when data collected from the mote network indicates the presence of one or more environmental factors associated with a reset condition. For example, the mote network may be signaled to reset as a result of completion of a task by the mote network, and/or as a result of damage to the mote network, and/or as a result of at least one of addition, removal, failure, or reconfiguration of one or more motes of the mote network. For example, motes 102-104 may be set up to sense and communicate data for a given period of time, say 24 hours, and may reset on task completion. As a second example, a mote network 102-104 in a room may experience water damage as a result of a false fire alarm, damaging mote 103, and triggering a network reset to reconfigure communications and sensing responsibilities. As a third example, motes may be blown into a pipe to join the current motes 102-104 therein; all motes in the expanded mote network may then reset to configure communications and sensing responsibilities.

Resetting a Mote Network

FIG. 2 is an action flow diagram of an embodiment of a process of resetting a mote network.

At 202 a synchronization signal is communicated by a controller to a mote network. Each mote 1, 2, and 3 of the network receives the synch signal and sets its clock accordingly. The three motes (there may of course be a different number in practice) may then operate with approximately synchronized clocks.

At 204 the controller sends a signal to the motes indicating that reset should occur at a time T4. The motes are operating with approximately synchronized clocks, so that at time T4 the three motes each perform a self-reset at approximately the same time. The combined effect of the self-resets is a systemic reset of the mote network.

Prior to performing the self-reset, mote 1 at 206 communicates stored data to the controller. The stored data is thus preserved from any memory purge that accompanies the self-reset.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into comprehensive devices and/or processes and/or systems via a reasonable amount of experimentation. Those having skill in the art will recognize that examples of such comprehensive devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc.); or (g) a wired/wireless services entity such as Sprint, Cingular, Nextel, etc.), etc.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The invention claimed is:

1. A method comprising:
a mote network receiving a signal to reset and applying the signal to reset to place the mote network into a reset condition; and
propagating a reset signal through at least a portion of the mote network to reset one or more subsets of motes within the portion of the mote network to one or more operational states in accordance with one or more types of sensors comprised by the one or more subsets of motes.

2. The method of claim 1, wherein receiving a signal to reset and applying the signal to reset to place the mote network into a reset condition further comprises:
signaling the mote network with state information stored external to the mote network.

3. The method of claim 1, wherein receiving a signal to reset and applying the signal to reset to place the mote network into a reset condition further comprises:
signaling the mote network to apply state information stored by the one or more motes of the mote network.

4. The method of claim 1, wherein receiving a signal to reset and applying the signal to reset to place the mote network into a reset condition further comprises:
at least one mote of the mote network authenticating a source of the signal.

5. The method of claim 4, wherein at least one mote of the mote network authenticating a source of the signal further comprises:
at least one mote of the mote network extracting authentication information from the signal and applying the authentication information to authenticate the source of the signal.

6. The method of claim 1, wherein receiving a signal to reset and applying the signal to reset to place the mote network into a reset condition further comprises:
signaling a mote network with the result that at least one mote removes itself from the mote network.

7. A mote network comprising:
logic to receive a signal to reset and to apply the signal to reset to place the mote network into a reset condition; and
logic to propagate a reset signal through at least a portion of the mote network to reset one or more subsets of motes within the portion of the mote network to one or more operational states in accordance with one or more types of sensors comprised by the one or more subsets of motes.

8. The mote network of claim 7, further comprising:
logic to reset the mote network to a previous operational state as a result of at least one of addition, removal, failure, or reconfiguration of one or more motes of the mote network.

9. The mote network of claim 7, wherein the logic to receive a signal to reset and to apply the signal to reset to place the mote network into a reset condition further comprises:

logic to assign at least one mote a status such that signals from the at least one mote are ignored and/or treated as unsuitable.

10. The mote network of claim 7, wherein the logic to receive a signal to reset and to apply the signal to reset to place the mote network into a reset condition further comprises:
logic to cause a first set of motes to each have a first state, and to cause a second set of motes to each have a second state.

11. The mote network of claim 7, wherein the logic to receive a signal to reset and to apply the signal to reset to place the mote network into a reset condition further comprises:
logic to cause all functional motes of the mote network to return to a same state.

12. The mote network of claim 7, wherein the logic to receive a signal to reset and to apply the signal to reset to place the mote network into a reset condition further comprises:
logic to reset different sets of motes sequentially to a previous operational state.

13. The mote network of claim 7, wherein the logic to receive a signal to reset and to apply the signal to reset to place the mote network into a reset condition further comprises:
logic to propagate the signal to reset through the mote network.

14. The mote network of claim 7, wherein the logic to receive a signal to reset and to apply the signal to reset to place the mote network into a reset condition further comprises:
logic to signal the mote network to reset when data collected from the mote network indicates the presence of one or more environmental factors associated with a reset condition.

15. A first method, comprising:
a. performing at least one of a reception of or a transmission of one or more instructions in relation to a second method that includes at least:
(i) a mote network receiving a signal to reset and applying the signal to reset to place the mote network into a reset condition; and
(ii) propagating a reset signal through the mote network to reset one or more subsets of motes within the network to one or more operational states in accordance with one or more types of sensors comprised by the one or more subsets of motes.

16. The first method of claim 15, wherein the second method further comprises:
one or more motes of the mote network creating a network restore point as a result of receiving the signal, wherein the network restore point saved as a result of receiving the signal further comprises operational state information of the mote network that is different from state information of an initial operational state of the mote network.

17. The first method of claim 15, wherein the second method further comprises:
signaling the mote network with the result that the network is reset to a previous operational state as a result of completion of a task by the mote network.

18. The first method of claim 15, wherein the second method that includes at least ... receiving a signal to reset and applying the signal to reset to place the mote network into a reset condition further comprises:
signaling the mote network when data collected from the mote network indicates the presence of one or more environmental factors associated with a reset condition.

19. The first method of claim 15, further comprising:
receiving a user authorization for the performing the at least one of the reception of or the transmission of the one or more instructions in relation to the second method.

20. The first method of claim 15, wherein the performing of at least one of a reception of or a transmission of one or more instructions in relation to a second method comprises:
receiving the one or more instructions; and
replacing a portion of a representation of the second method in response to the one or more instructions.

21. The first method of claim 15, wherein the performing of at least one of a reception of or a transmission of one or more instructions in relation to a second method comprises:
receiving the one or more instructions; and
patching a representation of the second method in response to the one or more instructions.

22. The first method of claim 15, wherein the performing of at least one of a reception of or a transmission of one or more instructions in relation to a second method comprises:
receiving the one or more instructions; and
forming a representation of the second method in response to the one or more instructions.

23. The first method of claim 15, wherein the performing of at least one of a reception of or a transmission of one or more instructions in relation to a second method comprises:
transmitting at least one indicator representative of the second method.

24. The first method of claim 15, wherein the performing of at least one of a reception of or a transmission of one or more instructions in relation to a second method comprises:
transmitting at least one instruction representative of a patch generated in response to a representation of the second method.

25. The first method of claim 15, wherein the performing of at least one of a reception of or a transmission of one or more instructions in relation to a second method comprises:
transmitting at least one instruction representative of an upgrade generated in response to a representation of the second method.

26. A first system, comprising:
a. means for performing a reception of or a transmission of one or more instructions in relation to a second system that includes at least one mote having:
(i) logic to receive a signal to reset and to apply the signal to reset to place the mote into a reset condition, wherein the logic to receive a signal to reset and to apply the signal to reset to place the mote into a reset condition further comprises:
(ii) logic to propagate a reset signal through the mote network to reset subsets of motes within the network to different operational states in accordance with the type of sensor comprised by the subsets of motes.

27. The first system of claim 26, wherein the second system that includes at least one mote having logic to receive a signal to reset and to apply the signal to reset to place the mote into a reset condition further comprises:
at least one mote having logic to return the mote to or near to an identified saved state.

28. The first system of claim 26, wherein the second system that includes at least one mote having logic to receive a signal to reset and to apply the signal to reset to place the mote into a reset condition further comprises:
at least one mote having logic to apply state information stored by the one or more other motes of the mote network.

29. The first system of claim 26, wherein the second system that includes at least one mote further comprises:

at least one mote having logic to communicate stored information before returning to a previous mote operational state as a result of receiving the signal to reset.

30. The first system of claim 26, wherein the second system that includes at least one mote further comprises:
at least one mote having logic to receive and apply information about a time at which to perform a reset.

31. The first system of claim 26, wherein the second system that includes at least one mote further comprises:
at least one mote having logic to receive and apply a synchronization signal prior to receiving and applying the signal to reset.

32. The first system of claim 26, wherein the second system that includes at least one mote further comprises:
at least one mote having logic to signal success or failure of applying the signal to reset.

33. A method of making a system comprising:
a. operably coupling at least two parts of a mote network, wherein operably coupling at least two parts of a mote network includes but is not limited to:
(i) operably coupling at least one mote having logic to receive a signal to reset and to apply the signal to reset to place the mote network into a reset condition; and
(ii) operably coupling at least one mote having logic to propagate a reset signal through the mote network to reset one or more subsets of motes within the network to one or more operational states in accordance with one or more types of sensors comprised by the one or more subsets of motes.

34. The method of claim 33, wherein operably coupling at least two parts of a mote network further comprises:
operably coupling at least one mote having logic to store a network restore point in a distributed fashion among motes of the mote network.

35. The method of claim 33, wherein operably coupling at least two parts of a mote network further comprises:
operably coupling at least one mote having logic to reset the mote network to a previous operational state as a result of completion of a task by the mote network.

36. The method of claim 33, wherein operably coupling at least two parts of a mote network further comprises:
operably coupling at least one mote having logic to reset the mote network to a previous operational state as a result of damage to the mote network.

37. The method of claim 33, wherein operably coupling at least one mote having logic to receive a signal to reset and to apply the signal to reset to place the mote network into a reset condition further comprises:
operably coupling at least one mote having logic to cause one or more motes of the mote network to remove itself from the mote network.

38. The method of claim 33, wherein operably coupling at least one mote having logic to receive a signal to reset and to apply the signal to reset to place the mote network into a reset condition further comprises:
logic to assign at least one mote a status such that signals from the at least one mote are ignored and/or treated as unsuitable.

39. The method of claim 33, wherein operably coupling at least two parts of a mote network comprises:
communicating with at least one part of a mote network via a signal bearing medium.

40. The method of claim 39, wherein communicating with at least one part of a mote network via a signal bearing medium comprises:
transmitting onto a signal bearing medium.

41. The method of claim 39, wherein communicating with at least one part of a mote network via a signal bearing medium comprises:
receiving from a signal bearing medium.

42. The method of claim 39, wherein communicating with at least one part of a mote network via a signal bearing medium comprises:
communicating via at least one of a digital communication link or an analog communication link.

43. The method of claim 39, wherein communicating with at least one part of a mote network via a signal bearing medium comprises:
communicating via a client-server communication link.

44. The method of claim 39, wherein communicating with at least one part of a mote network via a signal bearing medium comprises:
communicating via a peer-to-peer communication link.

45. The method of claim 39, wherein communicating with at least one part of a mote network via a signal bearing medium comprises:
communicating via a mobile-base station communication link.

* * * * *

UNITED STATES PATENT AND TRADEMARK OFFICE
CERTIFICATE OF CORRECTION

| | |
|---|---|
| PATENT NO. | : 7,925,360 B2 |
| APPLICATION NO. | : 12/586541 |
| DATED | : April 12, 2011 |
| INVENTOR(S) | : Lord et al. |

It is certified that error appears in the above-identified patent and that said Letters Patent is hereby corrected as shown below:

At Column 13, Line 41, Claim 36 please replace "The method of claim 33, wherein operably coupling at" with --The method of claim 33, wherein at least one of operably coupling at--

Signed and Sealed this
Eighteenth Day of December, 2012

David J. Kappos
*Director of the United States Patent and Trademark Office*